United States Patent
Arnold et al.

(10) Patent No.: US 7,428,250 B2
(45) Date of Patent: Sep. 23, 2008

(54) SYSTEM AND ASSOCIATED METHOD FOR RECEIVING DATA TELEGRAMS IN COMMUNICATION SYSTEMS HAVING REDUNDANT NETWORK PATHS

(75) Inventors: Johann Arnold, Wendelstein (DE); Dieter Brueckner, Unterleiterbach (DE); Franz-Josef Goetz, Heideck (DE); Dieter Klotz, Fuerth (DE); Juergen Schimmer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 681 days.

(21) Appl. No.: 10/809,449

(22) Filed: Mar. 26, 2004

(65) Prior Publication Data
US 2005/0041653 A1 Feb. 24, 2005

Related U.S. Application Data

(63) Continuation of application No. PCT/DE02/03430, filed on Sep. 13, 2002.

(30) Foreign Application Priority Data

Sep. 26, 2001 (DE) ................. 101 47 428
Jul. 26, 2002 (DE) ................. 102 34 149

(51) Int. Cl.
*H04J 3/06* (2006.01)

(52) U.S. Cl. .............. 370/510; 370/509; 370/513

(58) Field of Classification Search ........... 370/389, 370/390, 392, 394, 400, 401, 471, 474, 475, 370/476, 503, 504, 507, 509, 510, 513
See application file for complete search history.

(56) References Cited

U.S. PATENT DOCUMENTS

| | | | | |
|---|---|---|---|---|
| 6,247,058 B1 * | 6/2001 | Miller et al. | ............... | 709/234 |
| 6,549,938 B1 * | 4/2003 | Kilkki et al. | ............... | 709/207 |
| 6,584,122 B1 * | 6/2003 | Matthews et al. | ........... | 370/493 |
| 6,671,264 B1 * | 12/2003 | Koch et al. | .................. | 370/282 |
| 6,895,024 B1 * | 5/2005 | Drake et al. | ................. | 370/536 |
| 7,274,656 B2 * | 9/2007 | Lee et al. | .................... | 370/223 |
| 7,289,538 B1 * | 10/2007 | Paradise et al. | ............. | 370/497 |
| 7,301,897 B2 * | 11/2007 | Lutgen et al. | ............... | 370/229 |
| 7,339,887 B2 * | 3/2008 | Griswold et al. | ............ | 370/216 |

(Continued)

FOREIGN PATENT DOCUMENTS

DE 43 35 116 A1 4/1994

(Continued)

OTHER PUBLICATIONS

Resilient Fast Ethernet Ring Technology, Nov. 2002, RAD Data Communications, Ltd., 13 pages.*

(Continued)

*Primary Examiner*—Wing F. Chan
*Assistant Examiner*—Mark A. Mais
(74) *Attorney, Agent, or Firm*—Sughrue Mion, PLLC

(57) ABSTRACT

A method for receiving data messages in communications systems having redundant network paths. Received data of a peripheral representation or image is routed to a node along at least two different network paths. This makes it possible to store a consistent peripheral representation or image in a memory (12) of a node, if there is a disturbance in the data transmission along one network path.

10 Claims, 3 Drawing Sheets

U.S. PATENT DOCUMENTS 7,355,965 B2 * 4/2008 Griswold et al. ............ 370/216
7,355,978 B2 * 4/2008 Fontana et al. ........... 370/236.2

FOREIGN PATENT DOCUMENTS

| DE | 44 32 061 C1 | 12/1995 |
|---|---|---|
| DE | 100 58 524 A1 | 6/2002 |
| EP | 0 384 936 A1 | 9/1990 |
| EP | 0 507 022 A1 | 10/1992 |
| WO | WO 00/13376 A1 | 3/2000 |
| WO | WO0013376 * | 3/2000 |
| WO | WO 01/47207 A2 | 6/2001 |

OTHER PUBLICATIONS

O. Gerstel, "Combined WDM and Sonet Network Design", Conference of the IEEE Computer and Communications Societies, Mar. 21, 1999, pp. 734-743, New York NY.

* cited by examiner

SYSTEM AND ASSOCIATED METHOD FOR RECEIVING DATA TELEGRAMS IN COMMUNICATION SYSTEMS HAVING REDUNDANT NETWORK PATHS

This is a Continuation of International Application PCT/DE02/03430, with an international filing date of Sep. 13, 2002, which was published under PCT Article 21(2) in German, and the disclosure of which is incorporated into this application by reference.

FIELD OF AND BACKGROUND OF THE INVENTION

The invention relates to a system and associated method for receiving data telegrams in communication systems having redundant network paths.

Data networks are formed by networked data network nodes and enable communication among a plurality of subscribers. Therein, the term "communication" refers to transmitting data among the subscribers. The data to be transmitted are sent as data telegrams, i.e., the data are bundled into one or more packets and are then, in this form, sent to the respective recipient via the data network. Therefore, these packets are also referred to as data packets. Hereinafter, the terms "transmission of data" or "data transmission" are used synonymously with the aforementioned transmission of data telegrams or data packets.

For networking purposes, e.g., in switchable high-performance data networks such as, in particular, an Ethernet, the subscribers are connected to one another via coupling nodes. Each coupling node is connected with, e.g., more than two subscribers. Alternatively, each coupling node itself is a subscriber. Subscribers are, for example, computers, stored program controllers (SPCs) or other machines that exchange and, in particular, process electronic data with other machines.

In distributed automation systems, e.g., in the field of drive technology, certain data must arrive at certain subscribers at certain times and be processed by the recipients. Therein, the data are referred to as real-time critical data or real-time critical data traffic because a delayed arrival of the data at the destination leads to undesirable results at the subscriber.

It is also known in the prior art to use a synchronous, clocked communication system in an automation system, wherein the communication system has equidistance properties (isochronous communication system). This system is defined as a system that has at least two subscribers, which are connected to one another via a data network so as to mutually exchange or transmit data. Therein, the data exchange occurs cyclically in equidistant communication cycles (isochronous cycles), which are predetermined by the communication clock of the system. Subscribers are, for example, central automation devices, e.g., stored program controllers (SPCs, motion controls) or other control units, computers or machines that exchange electronic data with other machines and, in particular, process data of other machines. Further examples of subscribers include peripheral devices, such as, e.g., input/output modules, drives, actuators or sensors. The term "control units", as used hereinafter, refers to closed-loop or open-loop control units of any kind. For data transmission purposes, communication systems are used that include, for example, field bus, Profibus, Ethernet, Industrial Ethernet, FireWire or PC-internal bus systems (PCIs), etc.

Real-time communication is planned communication. Therein, at a fixed, predefined transmission instant, a subscriber forwards data telegrams over predefined ports. In addition, a receiving node expects real-time data packets at a specific time at a specific port. Therefore, due to the planning of the isochronous real-time communication, the path that the real-time telegram takes within the network is precisely defined. During one communication cycle, the complete peripheral representation in a node is exchanged. This peripheral representation includes all real-time critical data that a subscriber sends, receives and stores in a specific address space of a memory. During one cycle, the entire address space is overwritten.

Today, automation components (e.g., controls, drives, etc.) often have an interface to a cyclically clocked communication system. One operation level of the automation component (fast cycle) (e.g., position control in a control unit or speed and torque control of a drive) is synchronized to the communication cycle. Thereby, the communication clock is determined. In addition, other, low-performance algorithms (slow cycle) (e.g., temperature controls) of the automation component can communicate with other components (e.g., binary switches for fans, pumps, etc.) only via this communication clock, although a slower cycle would be sufficient. Using only one communication clock for transmitting all information within the system places high demands on the bandwidth of the transmission path.

In real-time communication in an isochronous Real-Time-Fast-Ethernet (IRTE), the isochronous cycle has an IRT time domain (IRT-Z) and an NRT time domain (NRT-Z, non-real-time). In the IRT time domain, the cyclic exchange of real-time data takes place, while, in the NRT time domain, communication takes place via a standard Ethernet communication. The NRT time domain is particularly suitable for transmitting data of lower-performance algorithms. As a result, these data need not be transmitted during each isochronous cycle. Thus, data traffic is reduced. German patent DE 100 58 524 discloses such a data network.

However, in standard Ethernet communication, data networks may have redundant network paths and/or closed rings. These must be broken up at one point, e.g., by means of the Spanning-Tree-Algorithm, since, otherwise, circulating data telegrams can occur. Therein, the topology is retained; however, a send port and a receive port of two neighboring nodes are turned off so as to eliminate a redundant network path.

FIG. 1 shows three successive isochronous cycles in an Isochronous Real-Time fast Ethernet (IRTE) in the case of real-time communication. German patent DE 100 58 524A discloses a corresponding communication system. The isochronous cycles with the cycle numbers 0, 1 and 2 have the same length. In each isochronous cycle, an IRT time domain is followed by an NRT time domain. The length of the NRT time domain is defined by the length of the entire isochronous cycle minus the IRT time domain.

Transmission errors that occur during the forwarding of data telegrams can lead to invalid or non-received data telegrams. In this case, the data telegrams are not available to complete the peripheral image. The peripheral image in a node is then inconsistent and unusable.

OBJECTS OF THE INVENTION

It is one object of the invention to provide an improved system for real-time communication purposes. The system is, in particularly, an Isochronous Real-Time-Fast-Ethernet.

SUMMARY OF THE INVENTION

According to one formulation of the invention, this and other objects are achieved by a method for receiving data telegrams, which are identified by identifiers, in an isochronous real-time fast Ethernet data network for real-time communication purposes. Therein, a node has at least a first receive port and a second receive port, and the data network has at least one redundant network path. At a first receive port, a first data telegram, which has an identifier, is received at a first timer value. In a memory of the node, user data of the first data telegram is stored in an address space that is assigned to the identifier. In addition, the first timer value is stored in the memory.

At the second receive port, a second data telegram is received at a second timer value, wherein the second data telegram has the identifier of the first data telegram. If the first timer value and the second timer value are not identical, the address space and the stored first timer value of the first data telegram are overwritten with user data of the second data telegram and with the second timer value of the second data telegram.

Therein, the first and second timer values, at which the respective first and second data telegrams are received, correspond to a cycle number of an isochronous cycle during which the respective first and second data telegrams are received.

In the method according to the invention, identical, real-time critical data telegrams, which are identified by their identifiers, are sent to a node via disjoint network paths during the planned real-time communication. Thus, at least one of the network paths is redundant, and the network has at least one closed ring. The node then receives all the data of the peripheral representation or image twice or multiple times. If there is a disturbance in the transmission on one network path, valid data telegrams are still received on an alternative network path.

As a result, the communication system is immune to disturbance and reliable. Advantageously, the communication system is used in automation systems, in particular in packaging machines, presses, plastic injection molding machines, textile machines, printing machines, machine tools, robots, handling systems, wood processing machines, glass processing machines, ceramics processing machines and lifting equipment.

When, at a certain timer value, a first real-time critical data telegram is received in a node having an application, the user data are stored in the memory address space assigned to the identifier. Thereafter, a second, real-time critical data telegram having the identifier of the first data telegram is received at a second receive port of the node. Therein, the first and the second receive ports may be identical.

In a further embodiment of the invention, the timer value is the cycle number of the cycle during which a data telegram is received.

In a preferred embodiment of the invention, the user data and the stored timer value of the first data telegram are overwritten with the user data and the timer value of the second data telegram, if the first and the second timer values are not identical.

In a further preferred embodiment of the invention, the user data and the timer value of the first data telegram are overwritten only if the second data telegram is valid.

In a particularly preferred embodiment of the invention, the first data telegram is invalid. The user data and the timer value of a first invalid data telegram are to be overwritten with the user data and the second timer value of a second valid data telegram, even if the two data telegrams have identical timer values.

BRIEF DESCRIPTION OF THE DRAWINGS

Preferred embodiments of the invention will now be described in greater detail with reference to the drawings, in which.

DETAILED DESCRIPTION OF THE PREFERRED EMBODIMENTS

Figure 1:
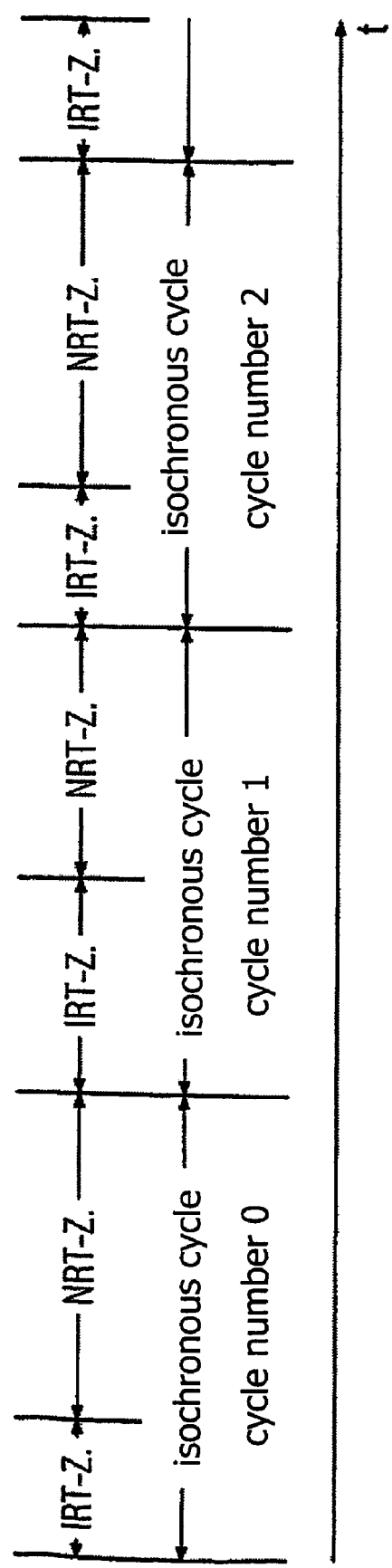
FIG. 1 shows a time diagram of the real-time communication in an IRTE.
Figure 2:
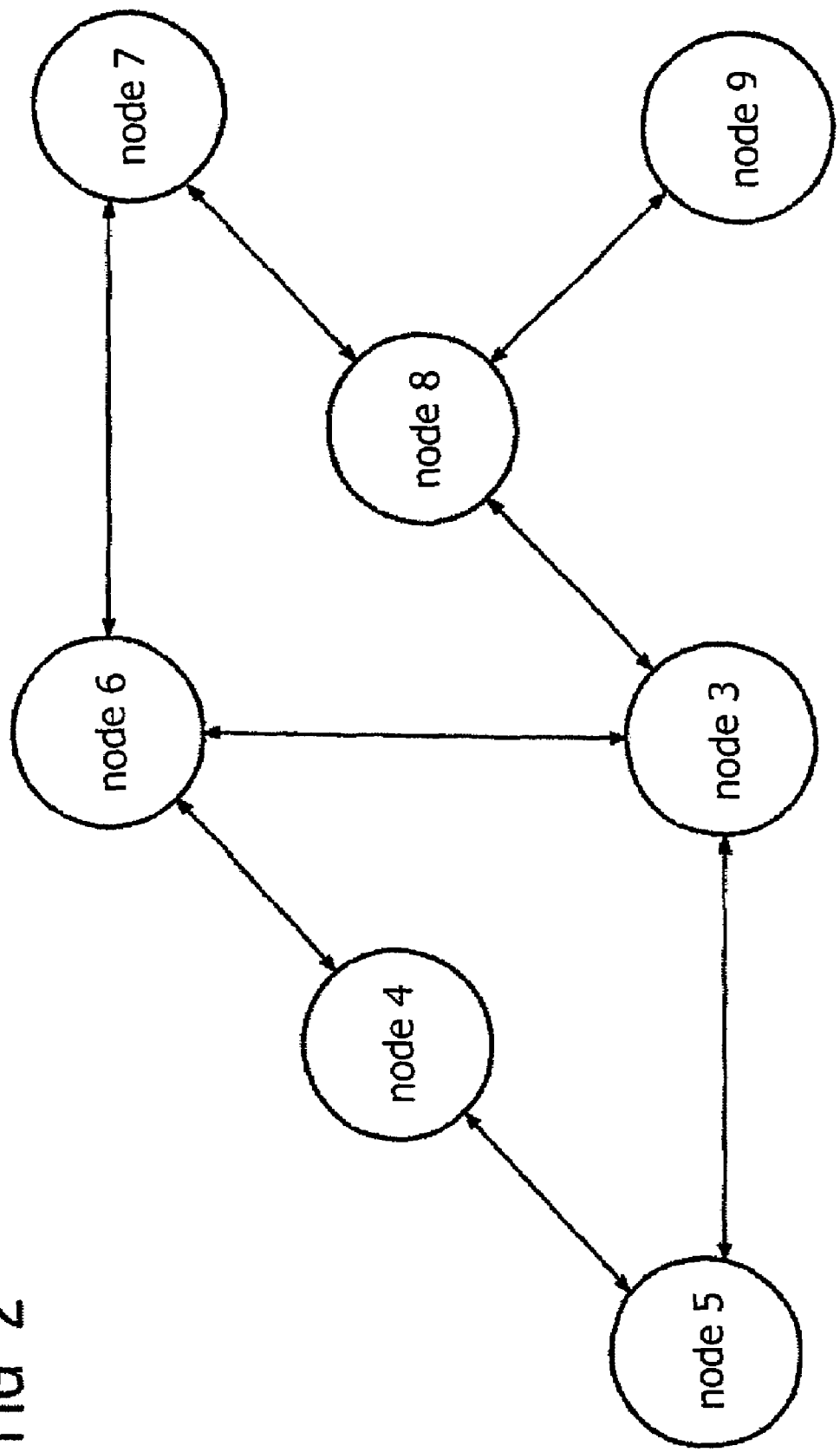
FIG. 2 shows an organization diagram of a data network for real-time communication having redundant network paths.

FIG. 2 shows a data network for real-time communication having redundant network paths. For example, node 3 can receive data telegrams from node 4 via node 5 or node 6 or via nodes 6, 7 and 8. Thus, two of these network paths are redundant. The redundant network paths are integrated into the data network so as to facilitate the method according to the invention for receiving data telegrams. Preferably, rings, which are formed by the redundant network paths, are broken up for the NRT portion of a cycle by means of a Spanning-Tree-algorithm so that no circulating data telegrams occur.

Figure 3:
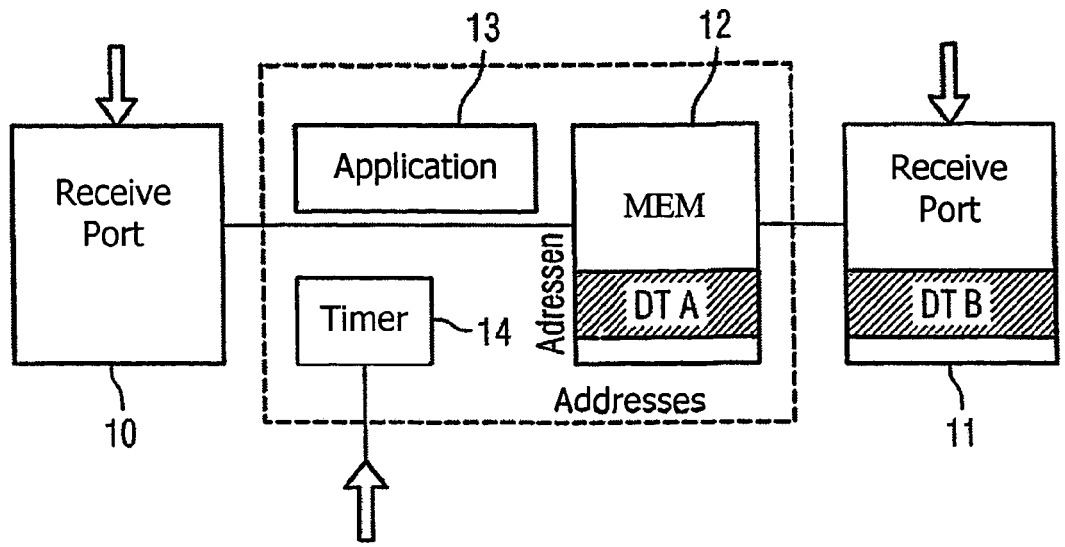
FIG. 3 shows a block diagram of a node according to the invention.

FIG. 3 shows a node according to the invention. The node according to the invention has receive ports 10 and 11. The user data or reference data of the data telegram DT A, which was previously received at the receive port 10, are stored in a certain address space of a memory 12. The address space is determined by the identifier of the data telegram DT A and/or such an address space is assigned to the identifier. An application 13 of the node accesses the data in the memory 12. The node has a timer 14, which is synchronized to the timers of other nodes of the data network. An additional data telegram DT B, which has the same identifier as the data telegram DT A, was received via the receive port 11.

Figure 4:
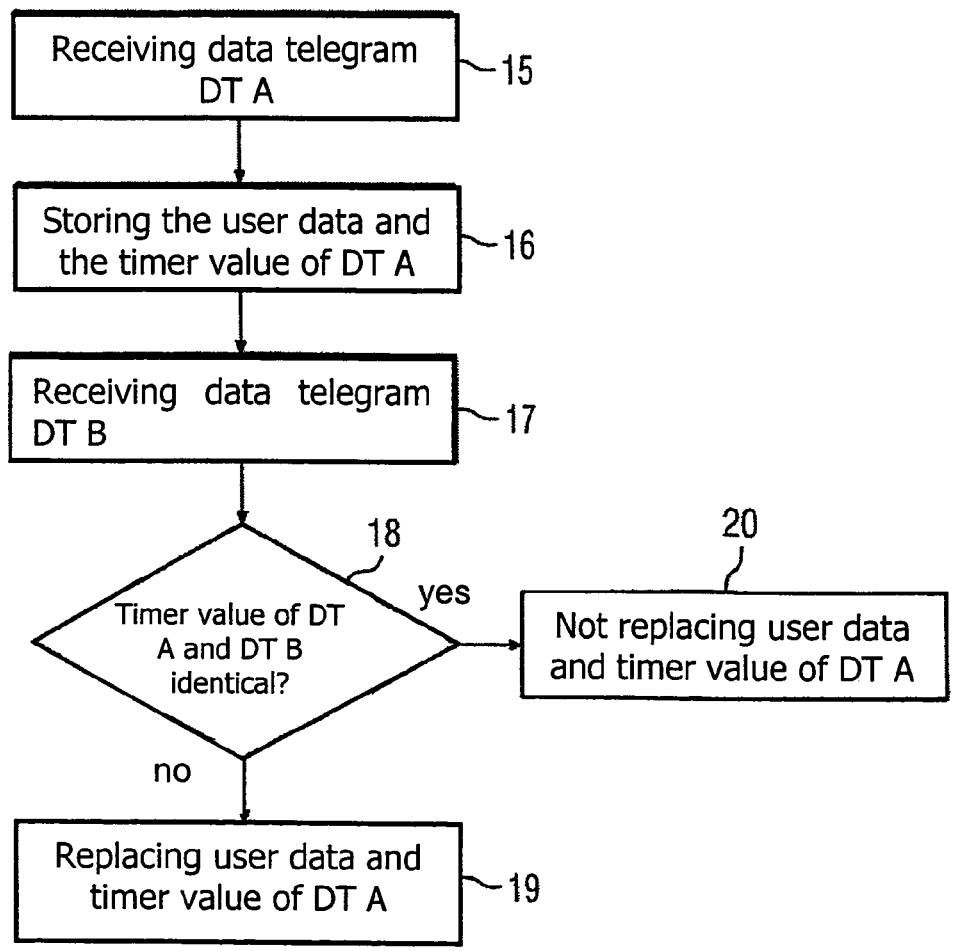
FIG. 4 shows a flow diagram of a method according to the invention for receiving data telegrams.

The mode of operation of the node according to the invention is illustrated in the flow diagram shown in FIG. 4.

First, the valid data telegram DT A is received (step 15). Its user data or reference data and its assigned timer value are then stored (step 16).

Thereafter, a further valid data telegram DT B is received (step 17).

If the timer values assigned to the data telegrams DT A and DT B are not identical (step 18), then the user data of the data telegram DT A and the timer value assigned to the data telegram DT A are replaced (step 19).

Preferably, the timer value is formed by a cycle counter, i.e., the timer value equals the current cycle number. Step 19 is executed if the data telegram DT A was not received in the current cycle because of a disturbance along the respective transmission path. When the data telegram DT B is received, the user data from the previous cycle are still in the memory, which are then replaced with the current user data.

If the timer values of the data telegrams DT A and DT B are identical, then the user data of the data telegram DT A do not need to be replaced with those of the data telegram DT B (step 20).

In summary, the invention relates to a system and a method for receiving data telegrams in communication systems that have redundant network paths. The received data of the peripheral representation or image are routed to a node via at least two different network paths. Thereby, it is possible to store a consistent peripheral representation or image in a memory (12) of the node, even if there is a disturbance in the data transmission on one of the network paths.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for receiving data telegrams, which are identified by identifiers, in an isochronous real-time fast Ethernet data network for real-time communication, wherein a node has at least a first receive port and a second receive port, and wherein the data network has at least one redundant network path, the method comprising:
   at the first receive port, receiving a first data telegram at a first timer value, wherein the first data telegram has an identifier;
   in a memory of the node, storing user data of the first data telegram in an address space that is assigned to the identifier;
   storing the first timer value;
   at the second receive port, receiving a second data telegram at a second timer value, wherein the second data telegram has the identifier of the first data telegram; and
   if the first timer value and the second timer value are not identical, overwriting the address space and the stored first timer value of the first data telegram with user data of the second data telegram and with the second timer value of the second data telegram;
   wherein a respective one of the first and second timer values, at which a respective one of the first and second data telegrams is received, corresponds to a cycle number of an isochronous cycle during which the respective one of the first and second data telegrams is received.

2. The method as claimed in claim 1, further comprising:
   if the first and the second timer values are identical, if the user data of the first data telegram are not valid, and if the user data of the second data telegram are valid, overwriting the address space with the user data of the second data telegram.

3. The method as claimed in claim 1, wherein the address space, which is assigned to the data telegrams having the identifiers, is overwritten with respective user data of a respective one of the data telegrams, only if the respective data telegram having a respective one of the identifiers is valid.

4. The method as claimed in claim 1, wherein, in addition to receiving real-time critical data, non-real-time critical data are received.

5. The method as claimed in claim 1, wherein only user data of valid data telegrams are stored in the address space.

6. A node having an application in an isochronous real-time fast Ethernet data network for real-time communication with at least one redundant network path, the node comprising:
   a first receiver configured to receive a first data telegram at a first receive port and at a first timer value, wherein the first data telegram has an identifier;
   a memory, wherein the memory is configured to store user data of the first data telegram in an address space that is assigned to the identifier, and wherein the memory is configured to store the first timer value;
   a second receiver configured to receive a second data telegram at a second receive port and at a second timer value, wherein the second data telegram has the identifier of the first data telegram; and
   a writer configured to overwrite the address space and the stored first timer value of the first data telegram with user data of the second data telegram and with the second timer value of the second data telegram, if the first timer value and the second timer value are not identical;
   wherein a respective one of the first and second timer values, at which a respective one of the first and second data telegrams is received, corresponds to a cycle number of an isochronous cycle during which the respective one of the first and second data telegrams is received.

7. An isochronous real-time fast Ethernet data network for real-time communication, comprising:
   at least one redundant network path; and
   a plurality of nodes, wherein at least one node has an application, and wherein the at least one node comprises:
   a first receiver configured to receive a first data telegram at a first receive port and at a first timer value, wherein the first data telegram has an identifier;
   a memory, wherein the memory is configured to store user data of the first data telegram in an address space that is assigned to the identifier, and wherein the memory is configured to store the first timer value;
   a second receiver configured to receive a second data telegram at a second receive port and at a second timer value, wherein the second data telegram has the identifier of the first data telegram; and
   a writer configured to overwrite the address space and the stored first timer value of the first data telegram with user data of the second data telegram and with the second timer value of the second data telegram, if the first timer value and the second timer value are not identical;
   wherein a respective one of the first and second timer values, at which a respective one of the first and second data telegrams is received, corresponds to a cycle number of an isochronous cycle during which the respective one of the first and second data telegrams is received.

8. A computer readable medium for a node in an isochronous real-time fast Ethernet data network for real-time communication by way of data telegrams identified by identifiers, the computer-readable medium storing instructions enabling a processor to perform the following operations:
   at a first receive port, receiving a first data telegram at a first timer value, wherein the first data telegram has an identifier;
   in a memory of the node, storing user data of the first data telegram in an address space that is assigned to the identifier;
   storing the first timer value;
   at a second receive port, receiving a second data telegram at a second timer value, wherein the second data telegram has the identifier of the first data telegram; and
   if the first timer value and the second timer value are not identical, overwriting the address space and the stored first timer value of the first data telegram with user data of the second data telegram and with the second timer value of the second data telegram;
   wherein a respective one of the first and second timer values, at which a respective one of the first and second data telegrams is received, corresponds to a cycle number of an isochronous cycle during which the respective one of the first and second data telegrams is received.

9. The method as claimed in claim 1, wherein the first timer value is a different value from the identifier of the first data telegram and wherein the second timer value is a different value from the identifier of the second data telegram.

10. The method as claimed in claim 1, wherein the isochronous cycle comprises of two time portions, cyclical exchange of non real time data and cyclical exchange of real-time data, wherein the first and second data telegrams are real time data, wherein paths of the network are broken up not to form a ring for the non real time data using Spanning-Tree-Algorithm.

* * * * *